US012046206B2

(12) United States Patent
Noh et al.

(10) Patent No.: US 12,046,206 B2
(45) Date of Patent: Jul. 23, 2024

(54) DISPLAY DEVICE AND UTILIZATION OF A PLURALITY OF BANDS ASSOCIATED WITH LUMINANCE

(71) Applicant: LG DISPLAY CO., LTD., Seoul (KR)

(72) Inventors: Junhwan Noh, Seoul (KR); DongSup Sim, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/953,462

(22) Filed: Sep. 27, 2022

(65) Prior Publication Data

US 2023/0094230 A1 Mar. 30, 2023

(30) Foreign Application Priority Data

Sep. 30, 2021 (KR) ........................ 10-2021-0129648

(51) Int. Cl.
*G09G 3/3291* (2016.01)
*G09G 3/20* (2006.01)
*G09G 3/3233* (2016.01)

(52) U.S. Cl.
CPC ......... *G09G 3/3291* (2013.01); *G09G 3/2096* (2013.01); *G09G 3/3233* (2013.01); *G09G 2300/0819* (2013.01); *G09G 2300/0842* (2013.01); *G09G 2310/08* (2013.01); *G09G 2320/0233* (2013.01); *G09G 2320/0247* (2013.01); *G09G 2330/021* (2013.01); *G09G 2360/16* (2013.01)

(58) Field of Classification Search
CPC .. G09G 3/3291; G09G 3/2096; G09G 3/3233; G09G 2300/0819; G09G 2300/0842; G09G 2310/08; G09G 2320/0233; G09G 2320/0247; G09G 2330/021; G09G 2360/16; G09G 2360/14–148; G09G 2320/0673; G09G 2320/0271–0276
See application file for complete search history.

(56) References Cited

U.S. PATENT DOCUMENTS

2011/0001737 A1* 1/2011 Kerofsky ................. G09G 5/10
345/207
2011/0074803 A1* 3/2011 Kerofsky ............. G09G 3/3406
345/589
2016/0189617 A1* 6/2016 Park ..................... G09G 3/3233
345/690
2016/0189635 A1* 6/2016 Lee ...................... G09G 3/3291
345/77

(Continued)

*Primary Examiner* — Roberto W Flores
(74) *Attorney, Agent, or Firm* — Morgan, Lewis & Bockius LLP

(57) ABSTRACT

A display device includes a display panel including a plurality of pixels connected to a data line and a gate line, a data driver configured to drive by dividing an active period to which a data voltage is applied to the data line and a blank period to which the data voltage is not applied, a gate driver to apply a scan signal to the gate line, and a controller to control the plurality of pixels to be driven in one of a plurality of bands having different highest target luminance. A parking voltage is applied to the data line during the blank period, and the parking voltage applied to the data line in at least one of the plurality of bands has a voltage level different from a voltage level of the parking voltage applied to the data line in the other band of the plurality of bands.

21 Claims, 15 Drawing Sheets

(56) References Cited

U.S. PATENT DOCUMENTS

| | | | | |
|---|---|---|---|---|
| 2017/0092192 | A1* | 3/2017 | Lin | G09G 3/3275 |
| 2018/0330674 | A1* | 11/2018 | Baar | H05B 45/20 |
| 2019/0114971 | A1* | 4/2019 | Choi | G09G 3/3266 |
| 2020/0074939 | A1* | 3/2020 | Kim | G09G 3/3291 |
| 2020/0202790 | A1* | 6/2020 | Rha | G09G 3/2003 |
| 2021/0012717 | A1* | 1/2021 | Park | G09G 3/20 |
| 2022/0108656 | A1* | 4/2022 | Lee | G09G 3/3233 |
| 2022/0319381 | A1* | 10/2022 | Xiao | G09G 3/2074 |

* cited by examiner

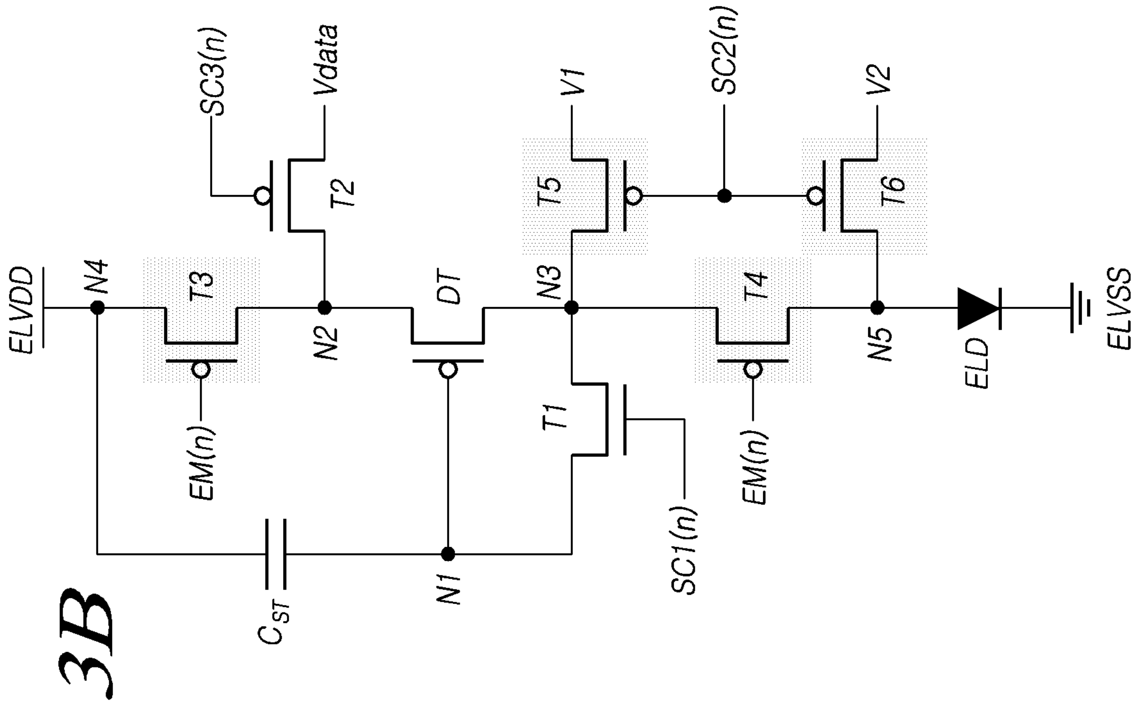
FIG.3B
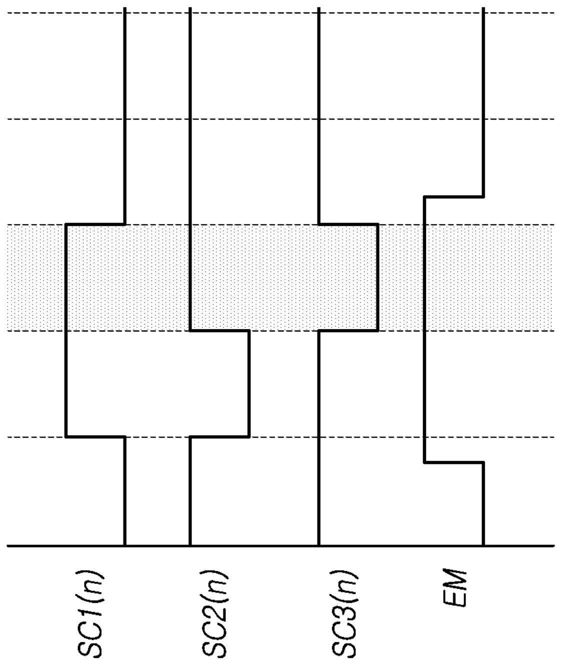

Band7

Band13

DISPLAY DEVICE AND UTILIZATION OF A PLURALITY OF BANDS ASSOCIATED WITH LUMINANCE

CROSS REFERENCE TO RELATED APPLICATION

This application claims priority from Korean Patent Application No. 10-2021-0129648, filed on Sep. 30, 2021, which is hereby incorporated by reference for all purposes as if fully set forth herein.

BACKGROUND

Technical Field

Embodiments of the present disclosure relates to a display device, more particularly, to a display device capable of improving the degradation of uniformity due to mura such as flicker and stains.

Discussion of the Related Art

A display device implementing a variety of information on a screen is a important technology in the information and communication era, and has been developing in the direction of thinner, lighter, and more portable and high-performance. Accordingly, a display device capable of being manufactured in a lightweight and thin form has been in the spotlight. A display device using a self-luminous element is not only advantageous in terms of power consumption due to low voltage driving, but also has excellent high-speed response speed, high luminous efficiency, viewing angle, and contrast ratio, and is being studied as a next-generation display device. The display device implements an image through a plurality of sub-pixels arranged in a matrix form. Each of the plurality of sub-pixels includes a light emitting device and a pixel circuit such as a plurality of transistors independently driving the light emitting device.

Specific examples of such a flat panel display may include a liquid crystal display (LCD), a quantum dot display (QD), a field emission display apparatus (FED), an organic light emitting diode (OLED) display, etc. The organic light emitting diode (OLED) display, which does not require a separate light source and is spotlighted as a means for compact device and vivid color display, uses an organic light emitting diode (OLED) for emitting light by itself, and has advantages of a fast response speed, a high contrast ratio, a high luminous efficiency, a high luminance, and a large viewing angle.

The organic light emitting diode display device including an organic light emitting diode has various advantages since the device displays an image based on light generated from a light emitting device in a pixel. However, the uniformity defects may occur due to mura such as flicker and stains caused by a coupling between internal lines of pixels during driving or operating conditions of driving signals. This may be a factor of lowering satisfaction with image quality of the display device.

Accordingly, various driving techniques have been developed to solve image abnormalities, and in order to improve image quality, it is necessary to improve operating performance by controlling driving conditions of pixels.

SUMMARY

Accordingly, embodiments of the present disclosure are directed to a display device that substantially obviates one or more of the problems due to limitations and disadvantages of the related art.

An aspect of the present disclosure is to provide a display device capable of improving a flicker and uniformity degradation by controlling a driving voltage condition of a pixel circuit.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a display device comprises a display panel comprising a plurality of pixels connected to a data line and a gate line, a data driver configured to drive by dividing an active period in which a data voltage is applied to the data line and a blank period in which the data voltage is not applied, a gate driver configured to apply a scan signal to the gate line, and a controller configured to control the plurality of pixels to be driven in one of a plurality of bands having different highest target luminance, wherein a parking voltage may be applied to the data line during the blank period, and the parking voltage applied to the data line in at least one of the plurality of bands has a voltage level different from a voltage level of the parking voltage applied to the data line in the other band of the plurality of bands.

In addition to the technical problems of the present disclosure mentioned above, other features and advantages of the present disclosure may be described below, or will be clearly understood by those skilled in the art from such description.

According to embodiments of the present disclosure, it is possible to reduce a mura of a parking voltage and improve the uniformity of the display panel to enhance image quality by applying the parking voltage to each of a plurality of bands.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles.

FIGS. 3A to 3C are diagrams for explaining the driving of a pixel circuit and a light emitting device of a display device according to an embodiment of the present disclosure.

DETAILED DESCRIPTION

Figure 1:
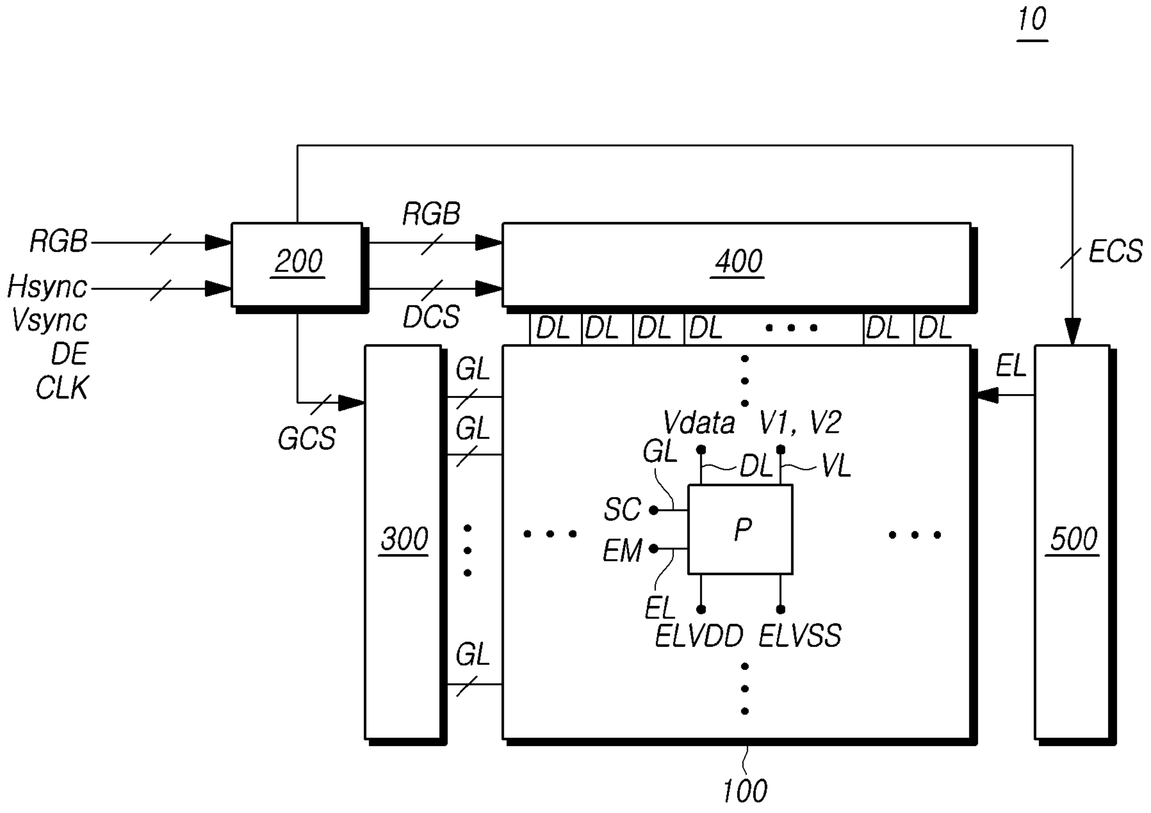
FIG. 1 is a block diagram of a display device according to an embodiment of the present disclosure.

The advantages and features of the present disclosure and a method therefor will become apparent with reference to the embodiments described below in detail in conjunction with the accompanying drawings. However, the present disclosure is not limited to the embodiments disclosed below, but will be implemented in various different forms. The present embodiments are provided to only explain the disclosure of the present specification is complete, and to completely inform those of ordinary skill in the art of this specification the scope of the invention, and the specification will be defined by the scope of the claims.

The shape, size, ratio, angle, number, etc. disclosed in the drawings for explaining the embodiment in the present specification are exemplary and the embodiment of the present specification is not limited to the illustrated matters. In addition, in describing the embodiment, if it is determined that a detailed description of a related known technology may unnecessarily obscure the gist of the embodiment, the detailed description thereof will be omitted.

In the case that the terms of 'include', 'have', 'consist', 'comprise' etc. are used in this specification, it should be understood as being able to add other parts or elements unless 'only' is used. When an element is expressed in the singular, there may be understood to include cases including the plural unless otherwise explicitly stated.

In addition, in interpreting the elements, it should be interpreted as including an error range even if there is no separate explicit description.

In the description related to spatial relationship, for example, when the positional relationship of two element is described using the terms of "on", "upper", "above", "below", "under", "beneath", "lower", "near", "close", "adjacent", it should be interpreted that one or more elements may be further "interposed" between the elements unless the terms such as "directly", "only" are used.

In the case of a description of a temporal relationship, for example, when a temporal relationship is described as 'after', 'following', 'next', 'then', 'before', it may include cases that are not continuous unless 'immediately' or 'directly' is used.

When the terms, such as "first", "second", or the like, are used herein to describe various elements or components, it should be considered that these elements or components are not limited thereto. These terms are merely used herein for distinguishing an element from other elements. Therefore, a first element mentioned below may be a second element in a technical concept of the present disclosure.

The term "at least one" should be understood to include all possible combinations of one or more related elements. For example, the meaning of "at least one of the first, second, and third elements" may mean all combinations of two or more elements of the first, second and third elements as well as each of the first, second or third element.

The features of each of the embodiments of the present specification may be partially or wholly combined or coupled with each other, and may be various technically linked or operated. In addition, each of the embodiments may be implemented independently of each other or may be implemented together in a related relationship.

Hereinafter, it will be described embodiments of a display device according to the present disclosure with reference to the drawings. In adding reference numerals to components of each drawing, the same components may have the same reference numerals as much as possible even though they are indicated on different drawings. In addition, since the scales of the components shown in the accompanying drawings may have different scales from the actual for convenience of description, the scales shown in the drawings are not limited thereto.

Hereinafter, it will be described embodiments of the present disclosure in detail with reference to the accompanying drawings.

FIG. 1 is a block diagram of a display device according to an embodiment of the present disclosure.

Referring to FIG. 1, a display device 10 may include a display panel 100 including a plurality of pixels, a gate driver 300 supplying a gate signal to each of the plurality of pixels, a data driver 400 supplying a data signal to each of the plurality of pixels, a light emission signal generator 500, and a controller 200 for supplying the light emission signal to each of the plurality of pixels.

The controller 200 may process the image data RGB input from the outside according to a size and resolution of the display panel 100 and supply the processed image data to the data driver 400. The controller 200 may use synchronization signals SYNC input from the outside, for example, a dot clock signal CLK, a data enable signal DE, a horizontal synchronization signal Hsync, and a vertical synchronization signal Vsyn to generate a plurality of gate control signal GCS, data control signals DCS, and emission control signals ECS. The generated plurality of gate control signal GCS, data control signals DCS, and emission control signals ECS may be supplied to the gate driver 300, the data driver 400 and the light emission signal generator 500 to control the gate driver 300, the data driver 400 and the light emission signal generator 500, respectively.

The controller 200 may be configured in combination with various processors, for example, a microprocessor, a mobile processor, an application processor, etc. depending on the device to which the controller is mounted.

The controller 200 may generate signals so that the pixels can be driven at various refresh rates. That is, the controller 200 may generate driving-related signals so that the pixel is driven in a variable refresh rate (VRR) mode or switchable between a first refresh rate and a second refresh rate. For example, the controller 200 may simply change a speed of the clock signal, generate a synchronization signal to generate a horizontal blank or a vertical blank, or use the gate driver 300 as a mask method so as to drive the pixels at various refresh rates.

In addition, the controller 200 may generate various signals for driving the pixel at the first refresh rate, and in particular, when driven at the first refresh rate, may generate the emission control signal ECS so as for the light emission signal generator 500 to generate the light emission signal EM(N) having a first duty ratio. Thereafter, the controller 200 may operate to drive the pixel at the second refresh rate, and may generate various signals for driving the pixel at the second refresh rate. In particular, when the pixel is driven at the second refresh rate, the controller may generate the emission control signal ECS so that the light emission signal generator 500 generates the emission signal EM(N) having a second duty ratio different from the first duty ratio.

The gate driver 300 may supply the scan signal SC to a gate line GL according to the gate control signal GCS supplied from the controller 200. Although FIG. 1 illustrates that the gate drivers 300 are spaced apart from one side of the display panel 100, the number and arrangement positions of the gate drivers 300 are not limited thereto. That is, the gate driver 300 may be disposed on one side or both sides of the display panel 100 in a gate-in-panel (GIP) method.

The data driver 400 converts the image data RGB into a data voltage Vdata according to the data control signal DCS supplied from the controller 200, and supplies the converted data voltage Vdata to the pixel through a data line DL.

In the display panel 100, a plurality of gate lines GL, a plurality of emission lines EL, and a plurality of data lines DL may cross each other, and each of the plurality of pixels may be connected to the gate line GL, the emission line EL and the data line DL. Specifically, one pixel receives the gate signal from the gate driver 300 through the gate line GL, receives the data signal from the data driver 400 through the data line DL, receives a data signal from the data driver 400 through the data line DL, receives the emission signal EM(N) through the emission line EL, and receives various power source signals through a power supply line. Here, the gate line GL supplies the scan signal SC, the emission line EL supplies the emission signal EM(N), and the data line DL supplies the data voltage Vdata. However, according to various embodiments, the gate line GL may include a plurality of scan signal lines, and the data line DL may additionally include a plurality of power supply lines VL. Also, the emission line EL may include a plurality of emission signal lines. In addition, one pixel receives a high potential voltage or a first power voltage ELVDD and a low potential voltage or a second power voltage ELVSS. In addition, first and second bias voltages V1 and V2 may be supplied through one or more power supply lines VL.

In addition, each pixel includes a light emitting device ELD and a pixel circuit for controlling driving of the light emitting device ELD. Here, the light emitting device ELD includes an anode, a cathode, and an organic light emitting layer between the anode and the cathode. The pixel circuit includes a plurality of switching devices, a driving switching device, and a capacitor. Here, the switching device may be constituted by a TFT, and in the pixel circuit, a driving TFT controls the amount of current supplied to the light emitting device ELD according to the difference between the data voltage charged in the capacitor and the reference voltage, thereby adjusting the amount of light emitted by the light emitting device ELD. In addition, a plurality of switching TFTs receive the scan signal SC supplied through the gate line GL and the emission signal EM(N) supplied through the emission line EL to charge the data voltage Vdata to the capacitor.

The display device 10 according to the embodiment of the present disclosure may include, for driving the display panel 100 including a plurality of pixels, the gate driver 300, the data driver 400, the light emission signal generator 500 and a controller 200 for controlling them. Here, the light emission signal generator 500 may be configured to adjust the duty ratio of the emission signal EM(N). For example, the light emission signal generator 500 may include a shift register and a latch for adjusting the duty ratio of the emission signal EM(N). When the pixel circuit is driven at the first refresh rate according to the emission control signal ECS generated by the controller 200, the light emission signal generator 500 may generate a emission signal having a first duty ratio and supply the emission signal to the pixel circuit. When the pixel circuit is driven at the second refresh rate, the light emission signal generator 500 may be configured to generate and supply a emission signal having a second duty ratio different from the first duty ratio to the pixel circuit.

Figure 2A:
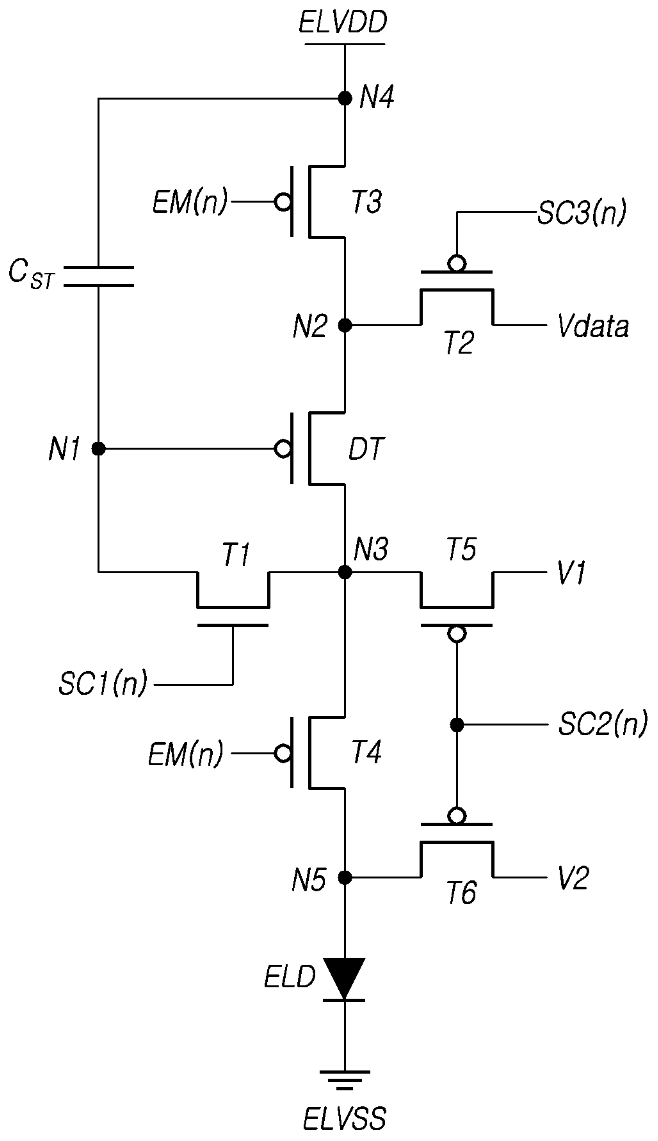
FIGS. 2A-2C are circuit diagrams illustrating a pixel circuit of a display device according to an embodiment of the present disclosure.
Figure 2B:
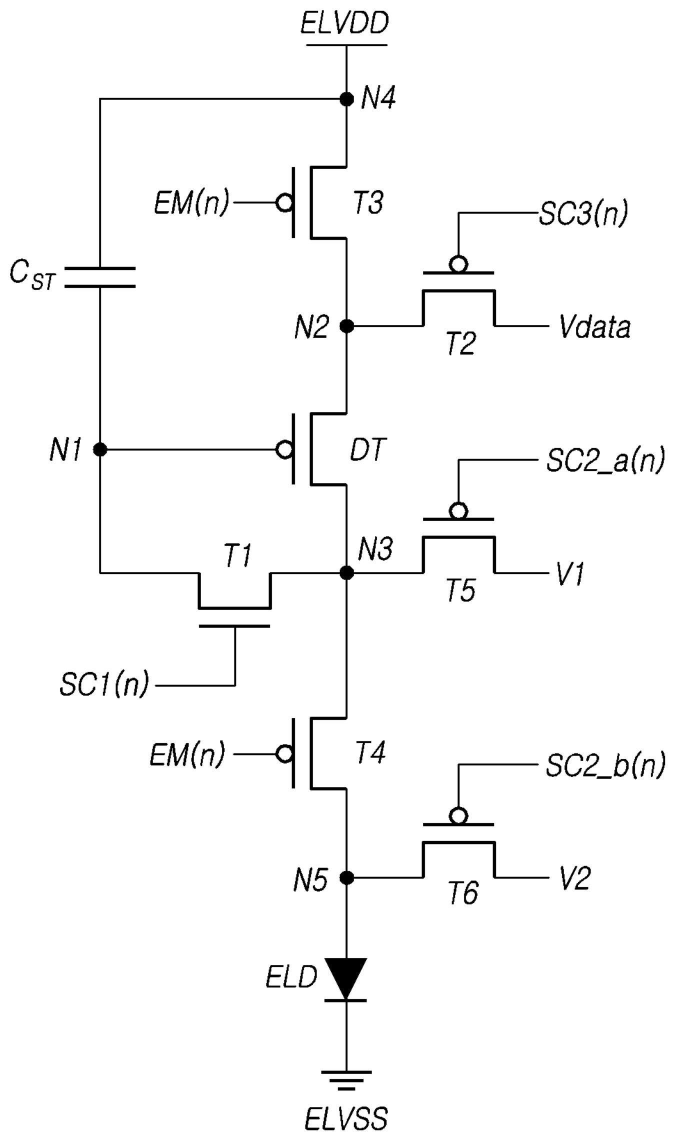
Figure 2C:
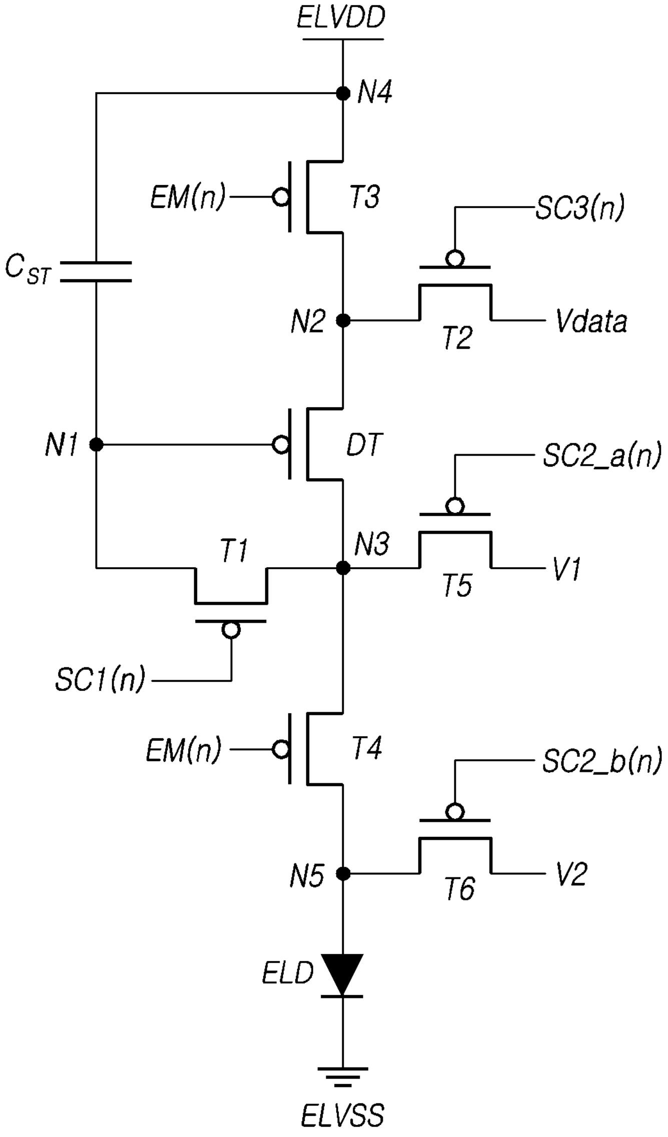

FIGS. 2A-2C are circuit diagrams illustrating a pixel circuit of a display device according to an embodiment of the present disclosure.

FIGS. 2A-2C only exemplify a pixel circuit for explanation, and is not limited thereto, as long as it has a structure capable of controlling light emission of the light emitting device ELD by applying the emission signal EM(N). For example, the pixel circuit may include an additional scan signal, a switching TFT connected thereto, and a switching TFT to which an additional initialization voltage is applied, and a connection relationship between switching devices or a connection position of a capacitor may be variously disposed. That is, if the light emission of the light emitting device ELD is controlled according to a change in the duty ratio of the emission signal EM(N) and the light emission can be controlled according to the refresh rate, there may be used pixel circuits having various structures. For example, various pixel circuits such as 3T1C, 4T1C, 6T1C, 7T1C, and 7T2C may be used. Hereinafter, it will be described a display device including the pixel circuit of 7T1C of FIGS. 2A-2C for convenience of description.

Referring to FIG. 2A, each of the plurality of pixels P may include a pixel circuit including a driving transistor DT and a light emitting device ELD connected to the pixel circuit.

The pixel circuit may drive the light emitting device ELD by controlling a driving current Id flowing through the light emitting device ELD. The pixel circuit may include the driving transistor DT, first to sixth transistors T1 to T6, and a storage capacitor Cst. Each of the transistors DT and T1 to T6 may include a first electrode, a second electrode, and a gate electrode. One of the first and second electrodes may be a source electrode, and the other of the first and second electrodes may be a drain electrode.

Each of the transistors DT and T1 to T6 may be a PMOS transistor or an NMOS transistor. In the embodiment of FIGS. 2A and 2B, the first transistor T1 is an NMOS transistor, and the other transistors DT and T2 to T6 are PMOS transistors. In addition, in the embodiment of FIG. 2C, the first transistor T1 is also configured as a PMOS transistor.

Hereinafter, it will be exemplarily described a case in which the first transistor T1 is an NMOS transistor, and the remaining transistors DT, T2 to T6 are PMOS transistors. Accordingly, the first transistor T1 is turned on by being applied a logic high voltage, and the other transistors DT, T2 to T6 are turned on by being applied a logic low voltage.

According to an example, the first transistor T1 constituting the pixel circuit may serve as a compensation transistor, the second transistor T2 may serve as a data supply transistor, the third and fourth transistors T3 and T4 may serve as light emission control transistors, and the fifth and sixth transistors T5 and T6 may serve as bias transistors.

The light emitting device ELD may include a pixel electrode (or an anode electrode) and a cathode electrode. The pixel electrode of the light emitting device ELD may be connected to a fifth node N5, and the cathode electrode may be connected to a second power voltage ELVSS.

The driving transistor DT may include a first electrode connected to a second node N2, a second electrode connected to a third node N3, and a gate electrode connected to the first node N1. The driving transistor DT may provide a driving current Id to the light emitting device ELD based on the voltage of the first node N1 (or a data voltage stored in the capacitor Cst to be described later).

The first transistor T1 may include a first electrode connected to the first node N1, a second electrode connected to the third node N3, and a gate electrode receiving a first scan signal SC1. The first transistor T1 may be turned on in response to the first scan signal SC1, and may transmit the data signal Vdata to the first node N1. The first transistor T1 may be diode-connected between the first node N1 and the third node N3 to sample a threshold voltage Vth of the driving transistor DT. The first transistor T1 may be a compensation transistor.

The capacitor Cst may be connected or formed between the first node N1 and a fourth node N4. The capacitor Cst may store or maintain the provided data signal Vdata.

The second transistor T2 has a first electrode connected to the data line DL (or receiving the data signal Vdata), a second electrode connected to the second node N2, and a gate electrode receiving a third scan signal SC3. The second transistor T2 may be turned on in response to the third scan signal SC3, and may transmit the data signal Vdata to the second node N2. The second transistor T2 may be a data supply transistor.

The third transistor T3 and the fourth transistor T4 (or the first and second light emission control transistors) may be connected between the first power voltage ELVDD and the light emitting device ELD, and may form a current movement path through which the driving current Id generated by the driving transistor DT flows.

The third transistor T3 may include a first electrode connected to the fourth node N4 to receive the first power voltage ELVDD, a second electrode connected to the second node N2, and a gate electrode for receiving the emission signal EM(N).

Similarly, the fourth transistor T4 may include a first electrode connected to the third node N3, a second electrode connected to the fourth node N5 (or a pixel electrode of the light emitting device ELD), and a gate electrode receiving the emission signal EM(N).

The third and fourth transistors T3 and T4 may be turned on in response to the emission signal EM(N), and in this case, the driving current Id is provided to the light emitting device ELD, and the light emitting device ELD may emit light with a luminance corresponding to the driving current Id.

The fifth transistor T5 may include a first electrode connected to the third node N3, a second electrode receiving the first bias voltage V1, and a gate electrode receiving a second scan signal SC2.

The sixth transistor T6 may include a first electrode connected to a fifth node N5, a second electrode receiving the second bias voltage V2, and a gate electrode receiving the second scan signal SC2. In FIG. 2A, the gate electrodes of the fifth and sixth transistors T5 and T6 are configured to receive the second scan signal SC2 in common. However, the present disclosure is not limited thereto, and as shown in FIGS. 2B and 2C, the gate electrodes of the fifth and sixth transistors T5 and T6 may be configured to receive separate scan signals to be independently controlled.

The sixth transistor T6 may include a first electrode connected to the fifth node N5, a second electrode connected to the second bias voltage V2, and a gate electrode receiving the second scan signal SC2. The sixth transistor T6 may be turned on in response to the second scan signal SC2 before the light emitting device ELD emits light (or after the light emitting device ELD emits light), and may initialize the pixel electrode (or the anode electrode) of the light emitting device ELD by using the second bias voltage V2. The light emitting device ELD may have a parasitic capacitor formed between the pixel electrode and the cathode electrode. In addition, the parasitic capacitor is charged while the light emitting device ELD emits light, so that the pixel electrode of the light emitting device ELD may have a specific voltage. Accordingly, by applying the second bias voltage V2 to the pixel electrode of the light emitting device ELD through the sixth transistor T6, the amount of charge accumulated in the light emitting device ELD may be initialized.

FIG. 3 is a diagram for explaining the driving of the pixel circuit and the light emitting device of the display device shown in FIG. 2.

Referring to FIG. 3, each of the plurality of pixels P may initialize a voltage charged or remaining in the pixel circuit. Specifically, the influence of the data voltage Vdata and the driving voltage VDD stored in the previous frame may be removed. Accordingly, each of the plurality of pixels P may display an image corresponding to the new data voltage Vdata.

The operation of the pixel circuit may include initialization period, a sampling period, and an emission period, but this is only an example and is not necessarily limited to this order.

Hereinafter, it will be described a process of driving the pixel circuit for each initialization period, sampling period, and emission period in detail with reference to FIGS. 3A to 3C.

Figure 3A:
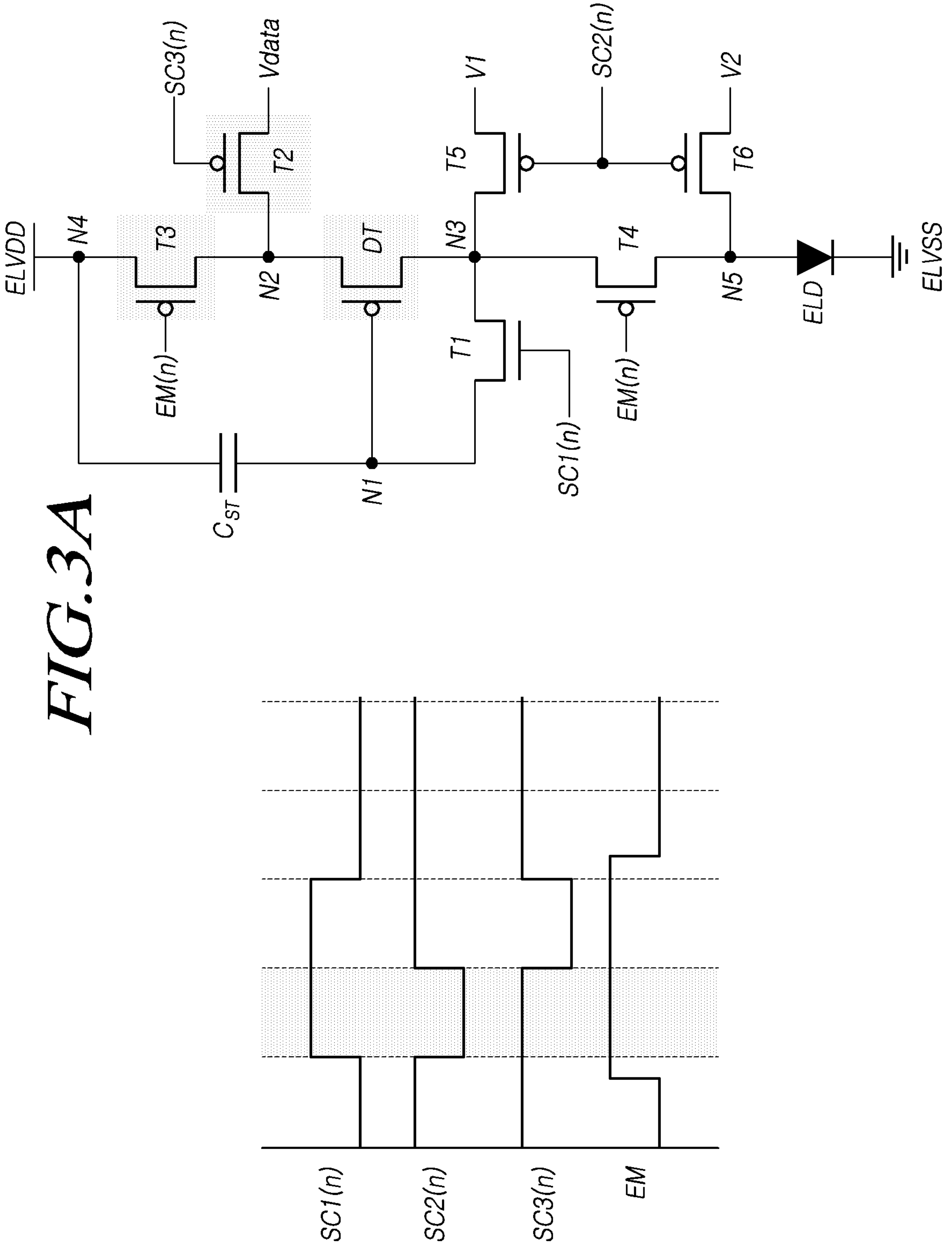

FIG. 3A corresponds to the initialization period. The initialization period is a period in which a voltage of the gate electrode of the driving transistor DT is initialized.

In FIG. 3A, a first scan signal SC1 is a logic high voltage, and the first transistor T1 is turned on. The second scan signal SC2 is a logic low voltage, and the fifth and sixth transistors T5 and T6 are turned on. As the first and fifth transistors T1 and T5 are turned on, the gate electrode of the driving transistor DT connected to the first node N1 is initialized to the first bias voltage V1. In addition, as the sixth transistor T6 is turned on, the pixel electrode (or the anode electrode) of the light emitting device ELD is initialized to the second bias voltage V2. However, as described above, the gate electrodes of the fifth and sixth transistors T5 and T6 may be configured to be independently controlled by receiving separate scan signals. That is, it is not always required to simultaneously apply the bias voltage to the source electrode of the driving transistor DT and the pixel electrode of the light emitting device ELD in the initialization period.

FIG. 3B illustrates a sampling period. In FIG. 3B, a logic low voltage is input as the third scan signal SC3, and the second transistor T2 is turned on. As the second transistor T2 is turned on, the Vdata voltage of the current frame is applied to the drain electrode of the driving transistor DT connected to the second node N2. The first transistor T1 maintains in an on state. Since the driving transistor DT is in a diode-connected state when the first transistor T1 is turned on, a voltage of the gate electrode of the driving transistor DT connected to the first node N1 becomes Vdata−|Vth|. That is, the first transistor T1 may be diode-connected between the first node N1 and the third node N3 to sample the threshold voltage Vth of the driving transistor DT.

Figure 3C:
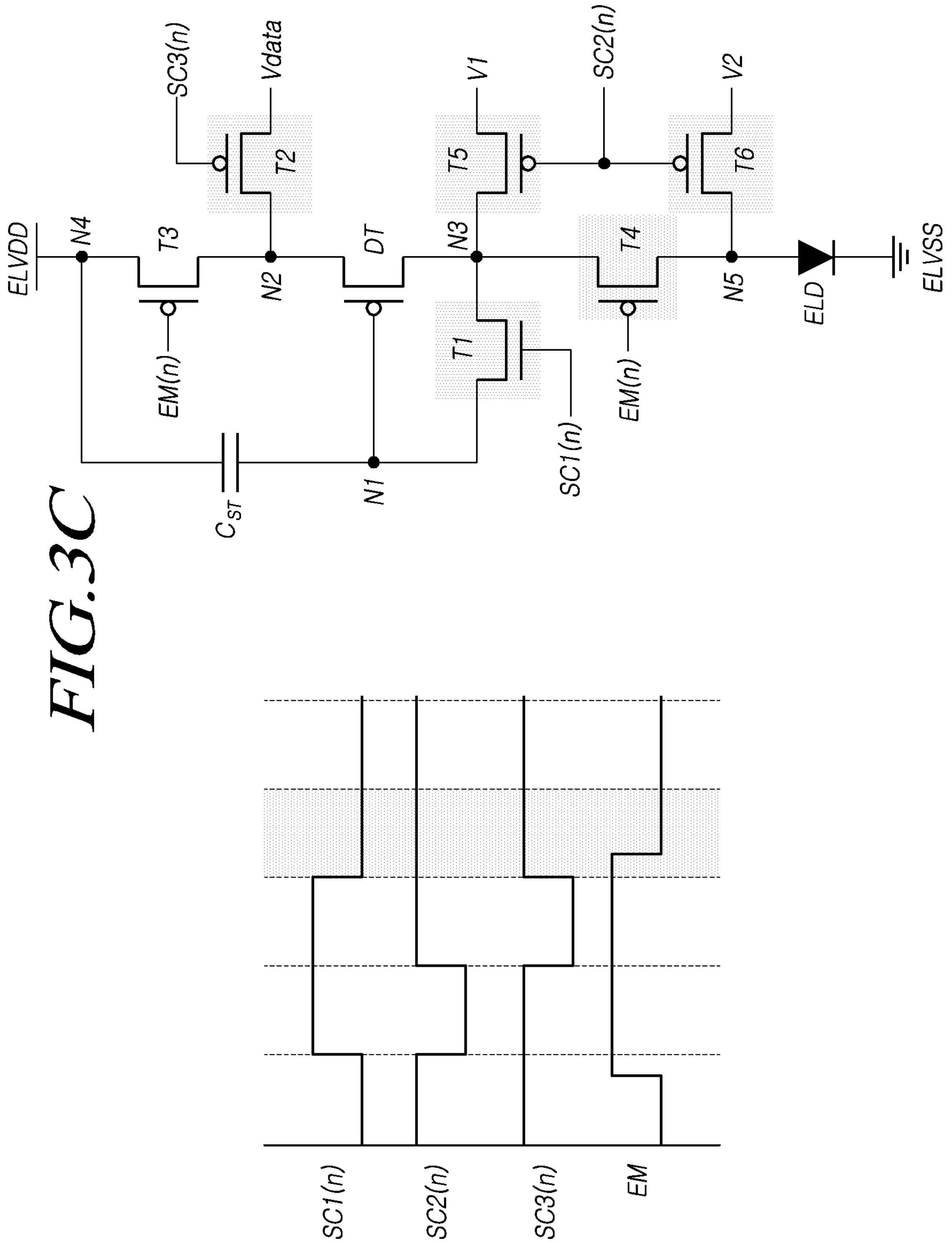

FIG. 3C illustrates the emission period. The emission period is a period in which the light emitting device ELD emits light with a driving current corresponding to a data voltage sampled after canceling the sampled threshold voltage Vth.

In FIG. 3C, the emission signal EM(N) is a logic low voltage, and the third and fourth transistors T3 and T4 are turned on.

As the third transistor T3 is turned on, the first power voltage ELVDD connected to the fourth node N4 is applied to the drain electrode of the driving transistor DT connected to the second node N2 through the third transistor T3. The driving current Id supplied by the driving transistor DT to the light emitting device ELD via the fourth transistor T4 is independent of the value of the threshold voltage Vth of the driving transistor DT, so that the threshold voltage Vth of the driving transistor DT may be compensated.

Figure 4:
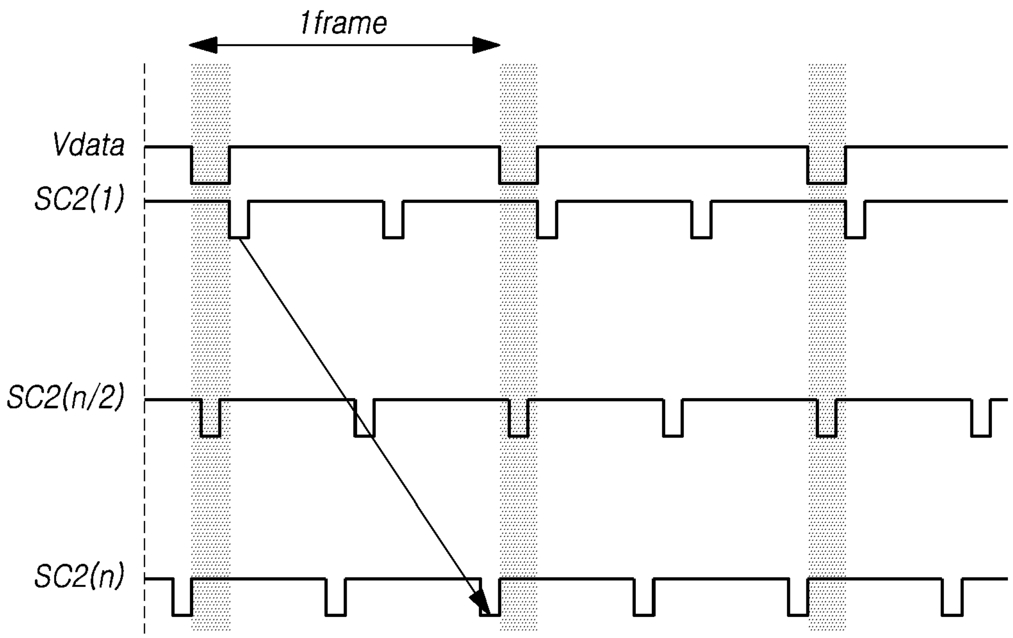
FIG. 4 illustrates an operation of a scan signal for one frame in a display device according to an embodiment of the present disclosure.

FIG. 4 illustrates an operation of a scan signal for one frame in a display device according to an embodiment of the present disclosure.

Referring to FIG. 4, each of the plurality of pixels P is driven at a constant frequency, and may be derived in a variable refresh rate (VRR) mode in which a refresh rate for updating the data voltage Vdata is increased to operate the pixel circuit when the high-speed driving is required, and the refresh rate is decreased to operate the pixel circuit so as to reduce power consumption when the low-speed driving is required.

Each of the plurality of pixels P may be driven through a combination of a refresh frame and a hold frame within one frame.

For example, on the case of driving at a refresh rate of 120 Hz, there may be driven only by the refresh frame, and when the refresh rate is driven at 60 Hz, the refresh frame and the hold frame may be driven alternately. That is, the refresh frame and the hold frame may be alternately driven 60 times in one frame.

Accordingly, during low-speed driving, the refresh frame and the hold frame are alternately driven, and in the hold frame, the pixel electrode of the light emitting device ELD is periodically initialized through the sixth transistor T6 of the pixel circuit, thereby reducing a hysteresis characteristic of the driving transistor DT.

In this case, the second scan signal SC2 supplied from the gate driver 300 to drive the sixth transistor T6 may be driven at a frequency twice higher than a driving frequency supplied from the controller 200 to the display panel 100.

For example, if the refresh rate is 120 Hz, the driving frequency may operate at 120 Hz, and the second scan signal SC2 for turning on the TFT may operate at 240 Hz. That is, since the second scan signal SC2 is driven at a frequency twice higher than the driving frequency, the number of times the sixth transistor T6 is turned on increases and the fifth node N5 is more frequently initialized, thereby improving the performance of the driving transistor DT.

Figure 5:
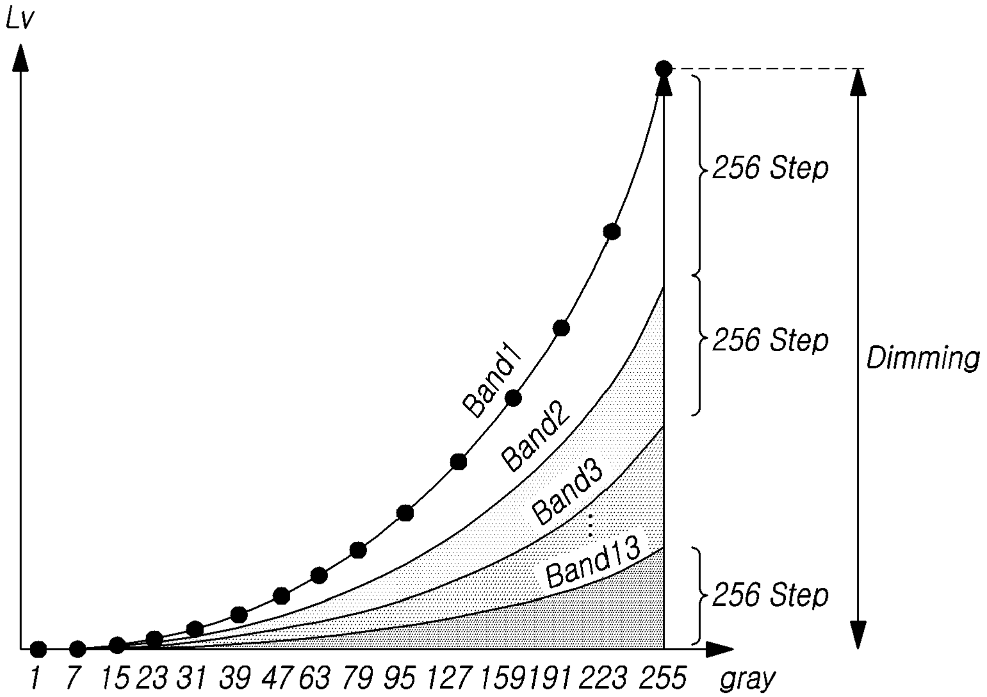
FIG. 5 illustrates a dimming level for each band of a pixel circuit in a display device according to an embodiment of the present disclosure.

FIG. 5 illustrates a dimming level for each band of a pixel circuit in a display device according to an embodiment of the present disclosure.

Referring to FIG. 5, the display panel 100 may include a plurality of bands Band1, Band2, Band3, . . . , Band13 to differently apply a target luminance Lv according to an operating environment. The plurality of bands Band1, Band2, Band3, . . . , Band13 may be a reference for adjusting the dimming level. For example, the first band Band1 may be a setting for a situation requiring the highest maximum target luminance Lv according to ambient illuminance in daylight. The second band Band2 may be a setting for a situation under the shade during the daytime. The seventh band Band1 may be a setting for a cloudy day, and the eighth band Band8 may be a setting in a night environment. The thirteenth band Band13 may be a setting for a darkroom environment. In addition, the band may be further subdivided and classified according to various usage environments and applications.

The plurality of bands Band1, Band2, Band3, . . . , Band13 may vary the dimming level to adjust the luminance step at a specific gray level. In addition, the target luminance Lv may be set so that the plurality of bands Band1, Band2, Band3, . . . , Band13 has the same number of luminance steps. For example, the target luminance Lv of the first band Band1 and the target luminance Lv of the second band Band2 may have a difference of 256 steps.

The dimming level for adjusting the luminance may be varied from 0 to 100%. Even with the same gray level, the dimming level is different depending on the band, and thus the luminance expressed may be different. For example, a maximum target luminance Lv of the first band Band1 may have a dimming level of 100%. In addition, the dimming level may be adjusted by a data voltage applied to the pixel, or may be adjusted according to a duty ratio of the emission signal EM(N).

Figure 6:
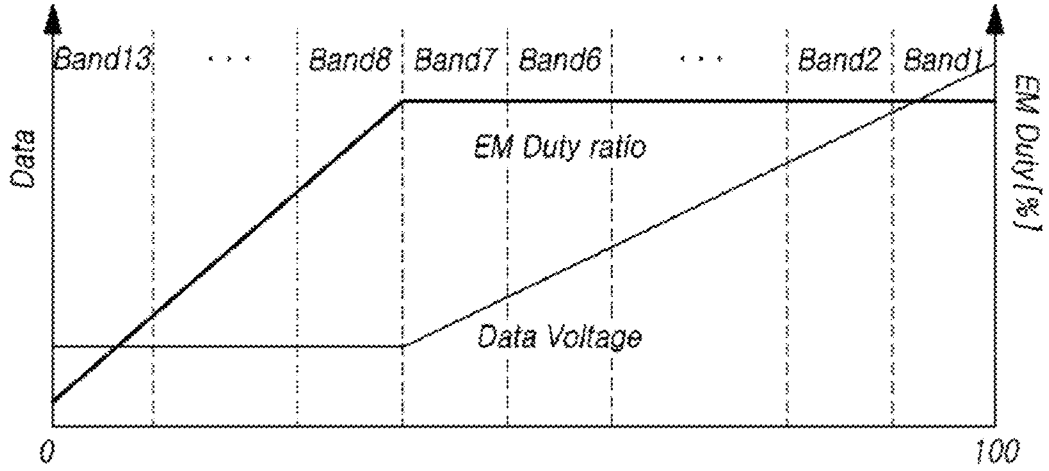
FIG. 6 illustrates a dimming level adjusting method for each band of a pixel circuit in a display device according to an embodiment of the present disclosure.

FIG. 6 illustrates a dimming level adjusting method for each band of a pixel circuit in a display device according to an embodiment of the present disclosure.

Referring to FIG. 6, the dimming levels of the plurality of bands Band1, Band2, Band3, . . . , Band13 may be adjusted according to at least one of a duty ratio of a data voltage Vdata applied to a pixel or a duty ratio of a emission signal EM(N).

In the plurality of bands Band1, Band2, Band3, . . . , Band13, the maximum target luminance Lv of one band may be the same as a minimum target luminance Lv of the other band. For example, a minimum target luminance Lv of the first band Band1 may be a maximum target luminance Lv of the second band Band2.

Since the first to seventh bands Band1, Band2, Band7 have a relatively high target luminance Lv, the amount of change in luminance for each gray level may be large. In this case, since the luminance corresponds to the data voltage Vdata, the dimming level may be adjusted by varying the data voltage Vdata.

In the eighth to thirteenth bands Band8, Band9, . . . , Band13, since the target luminance Lv is relatively low and the amount of change in luminance for each gray level is small, if the dimming level is adjusted through the data voltage Vdata, the pixel may not be driven normally. Accordingly, the dimming level in the eighth to thirteenth bands Band8, Band9, . . . , Band13 may be adjusted through the duty ratio of the emission signal EM(N).

That is, in the first to seventh bands Band1, Band2, . . . , Band7, the duty ratio of the emission signal EM(N) may be fixed or constant, and the dimming level may be adjusted by varying the data voltage Vdata. On the other hand, in the eighth to thirteenth bands Band8, Band9, . . . , Band13, the data voltage Vdata may be fixed or constant, and the dimming level may be adjusted by varying the duty ratio of the emission signal EM(N).

Figure 7A:
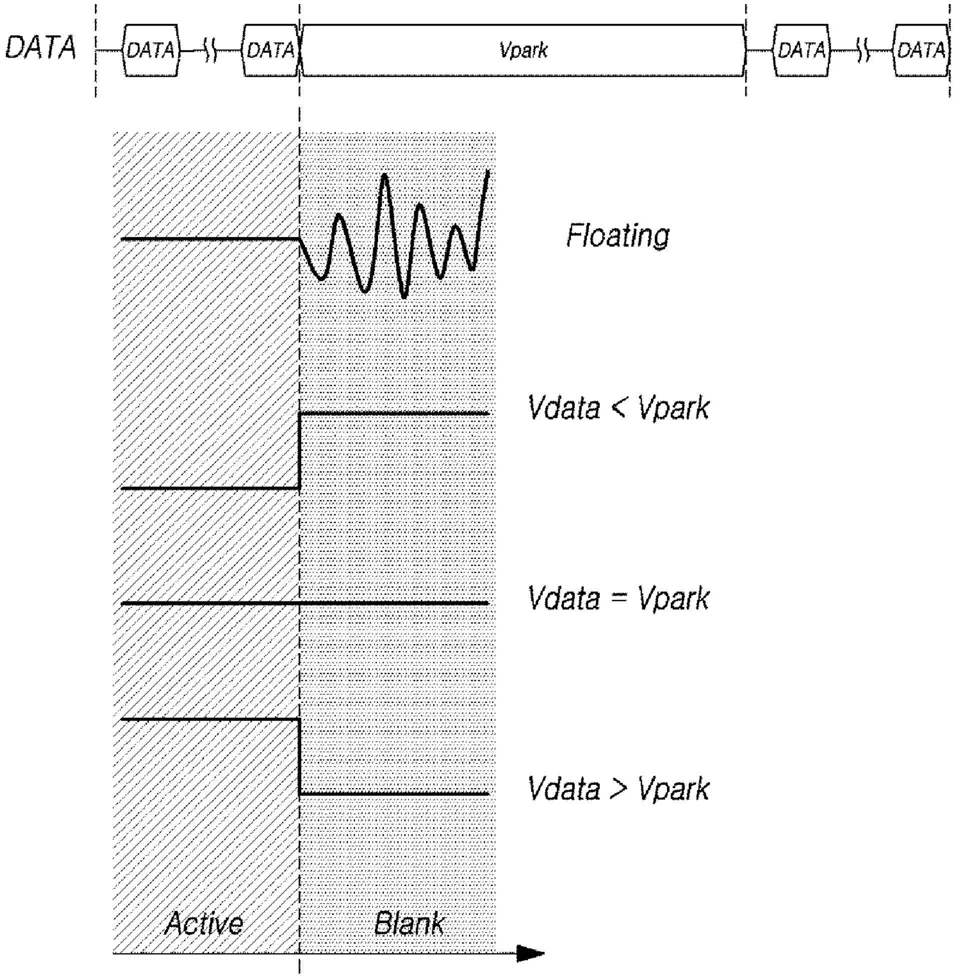
FIG. 7A illustrates a data voltage and a parking voltage of a display device according to an embodiment of the present disclosure.
Figure 7B:
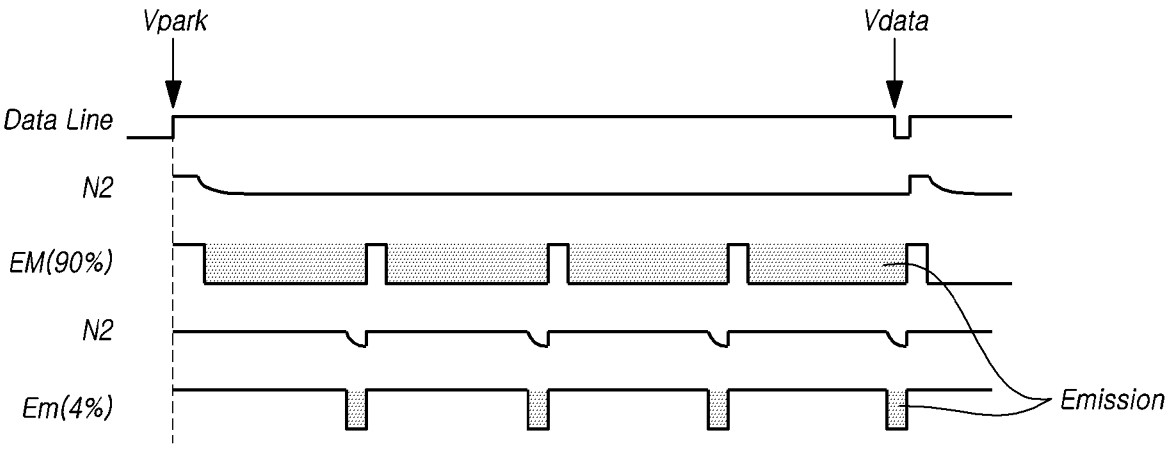
FIG. 7B illustrates a waveform change of a second node according to a duty ratio of a light emission signal in a pixel circuit.

FIG. 7A illustrates a data voltage and a parking voltage of a display device according to an embodiment of the present disclosure, and FIG. 7B illustrates a waveform change of a second node according to a duty ratio of a light emission signal in a pixel circuit.

Referring to FIG. 7A, a period in which the data voltage is applied may be an active period, and a period in which the data voltage is not applied may be a blank period. A refresh frame may be included during the active period, and both a refresh frame and a hold frame may be included in the blank period.

When the data line DL is in a floating state during the blank period, there may be affected the adjacent first and second nodes N1 and N2 by a coupling, which may cause the flicker.

Therefore, for a driving in variable refresh rate (VRR) mode, etc., a parking voltage Vpark may be applied during a blank period after the data voltage Vdata is applied to the data line DL and before the data voltage Vdata of the next frame is applied.

In this case of applying a parking voltage Vpark of a specific voltage level, since it is required to control the flicker performance of all gray levels with one parking voltage Vpark, there may be recognized a mura such as a strain in a specific gray level according to the relationship between the data voltage Vdata and the parking voltage Vpark. The mura such as a strain caused by this may be referred as a parking voltage mura (Vpark Mura).

In addition, when the parking voltage Vpark of a specific voltage level is applied during the blank period, since the second scan signal SC2 sequentially applied to the gate line GL operates at twice the driving frequency, a plurality of pixels located in the central portion of the display panel 100 may operate such that the sixth transistor T6 is turned on. As a result, a coupling occurs between the data line DL and the fifth node N5, which may cause the parking voltage mura (Vpark Mura) in the central region of the display panel 100, thereby reducing uniformity.

The parking voltage mura is more sensitive to a low gray level according to the voltage level of the parking voltage Vpark, and the light emitting device ELD may emit light unnecessarily.

Referring to FIG. 7B, even if the data voltage Vdata and the parking voltage Vpark are at the same level, emission characteristics may be different depending on the duty ratio of the emission signal EM(N).

As shown in FIG. 6, the first to seventh bands Band1, Band2, . . . , Band7 have a relatively high target luminance Lv, and the duty ratio of the emission signal EM(N) may be fixed, and the dimming level may be adjusted by varying the data voltage Vdata. In addition, in the eighth to thirteenth bands Band8, Band9, Band13, the data voltage Vdata may be fixed, and the dimming level may be adjusted by varying the duty ratio of the emission signal EM(N).

Accordingly, since the first to seventh bands Band1, Band2, . . . , Band7 apply the same duty ratio of the emission signal EM(N), the emission characteristics are also the same. On the other hand, in the eighth to thirteenth bands Band8, Band9, . . . , Band13, since the dimming level is adjusted through the duty ratio of the emission signal EM(N), the emission characteristics may be different from each other.

That is, in the second node N2 to which the third transistor T3 turned on/off according to the emission signal EM(N) is connected, a voltage waveform may vary according to a duty ratio of the emission signal EM(N).

For example, if the duty ratio of the emission signal EM(N) operates at 90%, in the blank period in which the parking voltage Vpark is applied, the voltage waveform of the second node node2 may be continuously maintained even while the emission signal EM(N) is not applied. In addition, if the duty ratio of the emission signal EM(N) is 4%, the voltage waveform of the second node node2 may be changed only at the moment when the emission signal EM(N) is applied.

That is, since the voltage level of the required parking voltage Vpark is different according to the luminance, in order to reduce the flicker phenomenon and the parking voltage mura, it is required to apply a different parking voltage Vpark for each of the plurality of bands Band1, Band2, Band3, . . . , Band13.

Figure 8:
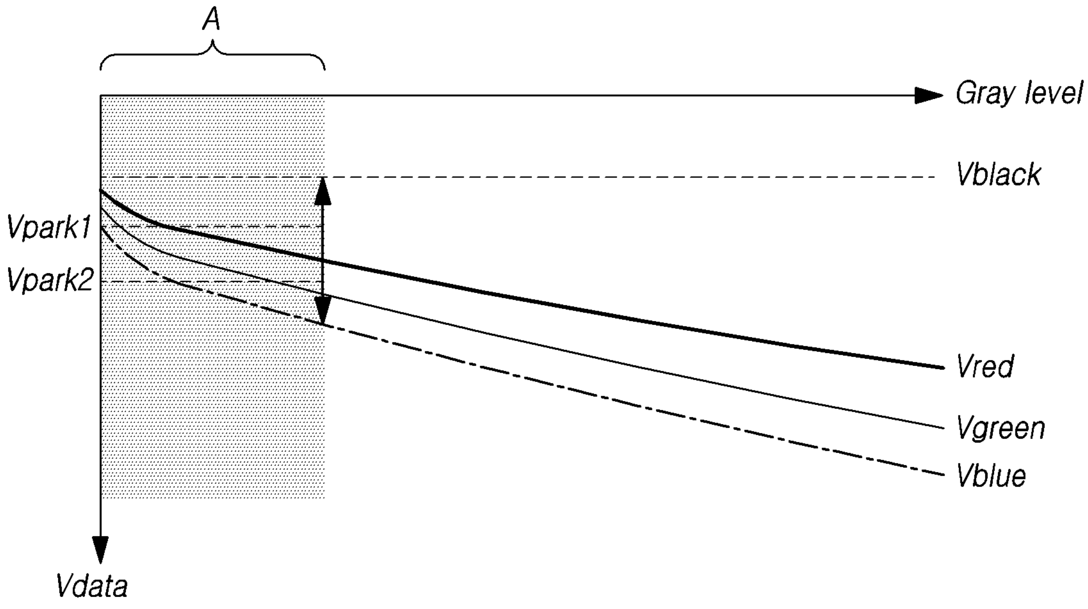
FIG. 8 illustrates a parking voltage mura generated according to a parking voltage in a display device according to an embodiment of the present disclosure.

FIG. 8 illustrates a parking voltage mura generated according to a parking voltage in a display device according to an embodiment of the present disclosure.

Referring to FIG. 8, a region A is a region where the parking voltage mura is recognized in the low gray level section, and the optimal parking voltage Vpark may be calculated using a black light voltage Vblack and a blue light voltage Vblue.

The sub-pixels of each of the plurality of pixels may be first to third sub-pixels emitting light of different colors. For example, a first sub-pixel may emit red light, a second sub-pixel may emit green light, and a third sub-pixel may emit blue light. In addition to the red light, green light and blue light, the first to third sub-pixels may be each independently driven or driven together to express colors. In addition, the blue light emitted from the third sub-pixel may be driven at the lowest voltage level, and the black light may be driven at the highest voltage level.

In this case, the closer the parking voltage Vpark is to the black light voltage Vblack, the darker the parking voltage mura may be recognized. In other words, if the parking voltage Vpark is set to a first level Vpark1, the red light, the green light, and the blue light of the first to third sub-pixels are all up-coupled, so that there may be occur a dark visible parking voltage mura.

Conversely, if the parking voltage Vpark is set to a second level Vpark2 close to the blue light voltage Vblue, a reddish parking voltage mura may be generated due to an influence of doun-coupling.

Therefore, it is necessary to set the parking voltage Vpark as an internal division point between the blue light voltage Vblue and the black light voltage Vblack to balance the difference between the data voltage Vdata and the parking voltage Vpark.

Figure 9A:
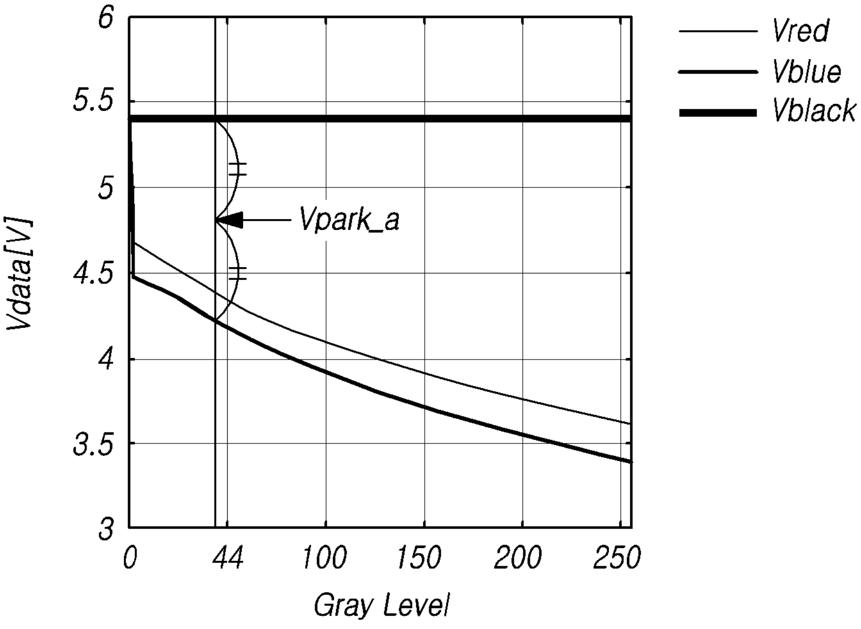
FIGS. 9A to 9B are diagrams for explaining a calculation of an optimal parking voltage in a display device according to an embodiment of the present disclosure.
Figure 9B:
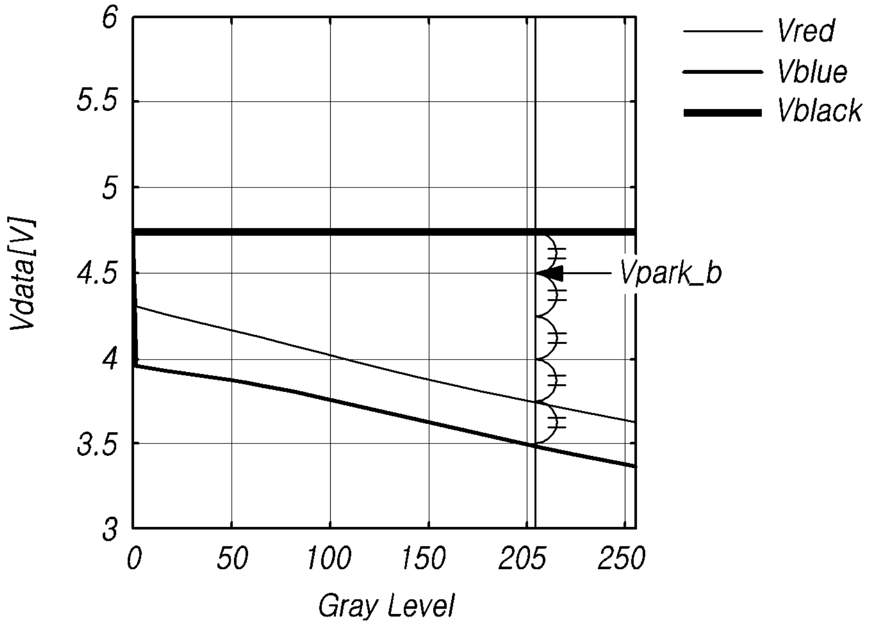

FIGS. 9A to 9B are diagrams for explaining a calculation of an optimal parking voltage in a display device according to an embodiment of the present disclosure.

Referring to FIG. 9, the plurality of bands Band1, Band2, Band3, . . . , Band13 respectively express different target luminance Lv. Among the plurality of bands Band1, Band2, Band3, . . . , Band13, the first to seventh bands Band1, Band2, . . . , Band7 may have the same light emission characteristics, and the eighth to thirteenth bands Band8, Band9, . . . , Band13 may control the dimming level by varying the duty ratio of the emission signal EM(N). Accordingly, the optimal parking voltage Vpark may be different from each other due to different emission characteristics.

In this case, in the seventh band Band7 and the thirteenth band Band13 which have different light emission characteristics, the optimal parking voltage Vpark may be calculated according to a relational expression at a specific ratio between the black light voltage Vblack and the blue voltage Vblue.

For example, a maximum target luminance Lv of the seventh band Band7 may be 100 nits, and a maximum target luminance Lv of the thirteenth band Band13 may be 4 nits. The 44 gray levels of the seventh band Band7 and the 205 gray levels of the thirteenth band Band13 each corresponds to a luminance level of 2 nits, and at a luminance level higher than this, the parking voltage mura is not recognized.

In order to balance the difference between the data voltage Vdata and the parking voltage Vpark, the parking voltage Vpark is required to be set as an internal division point between the blue light voltage Vblue and the black light voltage Vblack. The optimum parking voltage Vpark_a in the seventh band Band7 may be calculated according to [Equation 1] derived through a visual evaluation experiment.

$$V_{park\_a} = \frac{V_{black} + V_{blue}(G1)}{2} \quad \text{[Equation 1]}$$

In the Equation 1, $V_{park\_a}$ is the optimum parking voltage in the seventh band Band7, $V_{black}$ is the black light voltage, and $V_{blue}$(G1) is the blue light voltage in the first gray level G1. For example, the G1 gray level may be 44 gray levels.

Similarly, in the thirteenth band Band13 having the lowest maximum target luminance Lv, the optimal parking voltage $V_{park\_b}$ may be closer to the black light voltage Vblack than that in the seventh band Band7, and may be calculated according to [Equation 2]

$$V_{park\_b} = V_{blue}(G2) + 4 * \frac{V_{black} - V_{blue}(G2)}{5} \quad \text{[Equation 2]}$$

In the Equation 2, $V_{park\_b}$ is the optimum parking voltage in the thirteenth band Band13, $V_{black}$ is the black light voltage, and $V_{blue}$(G2) is the blue light voltage in the second gray level G2. Here, the second gray level G2 may be a higher gray level than the first gray level G1, for example, may be 205 gray levels.

In addition, for the remaining eighth to twelfth bands Band8, Band9, . . . , Band12 having different emission characteristics, each parking voltage Vpark may be obtained through linear interpolation between the optimum parking voltage Vpark_a calculated in the seventh band Band1 and the optimum parking voltage Vpark_b calculated in the thirteenth band Band13.

Therefore, by applying the parking voltage Vpark calculated for each of the plurality of bands Band1, Band2, Band3, . . . , Band13 to the data line DL during the blank period, it is possible to reduce the parking voltage mura (Vpark Mura).

In addition, as the parking voltage mura is reduced, the uniformity of the display panel 100 may be improved and image quality may be improved.

A display device according to an embodiment of the present disclosure may be described as follows.

A display device according to an embodiment of the present disclosure may include a display panel comprising a plurality of pixels connected to a data line and a gate line, a data driver configured to drive by dividing an active period in which a data voltage is applied to the data line and a blank period in which the data voltage is not applied, a gate driver configured to apply a scan signal to the gate line, and a controller configured to control the plurality of pixels to be driven in one of a plurality of bands having different highest target luminance. In this case, a parking voltage may be applied to the data line during the blank period, and the parking voltage applied to the data line in at least one of the plurality of bands has a voltage level different from a voltage level of the parking voltage applied to the data line in the other band of the plurality of bands.

In the display device according to the embodiment of the present disclosure, the plurality of bands may include first to thirteenth bands, and in the first to thirteenth bands, dimming levels may be adjusted according to the duty ratio of the emission signal or a magnitude of the data voltage.

In the display device according to the embodiment of the present disclosure, the duty ratio of the emission signal in the first to seventh bands may be constant and the data voltage may be varied.

In the display device according to the embodiment of the present disclosure, the first to seventh bands may have the same light emission characteristics. In each of the first to seventh bands, light emission characteristics of pixels may be the same.

In the display device according to the embodiment of the present disclosure, the parking voltage in the seventh band may be calculated through Equation 1.

In the display device according to the embodiment of the present disclosure, in the eighth to thirteenth bands, the duty ratio of the emission signal may be varied, and the data voltage may be constant.

In the display device according to the embodiment of the present disclosure, the parking voltage in the thirteenth band may be calculated through Equation 2.

In the display device according to the embodiment of the present disclosure, the parking voltage may be calculated using a voltage ratio of black light and blue light.

In the display device according to the embodiment of the present disclosure, the parking voltages of the first band to the seventh band may be the same.

In the display device according to the embodiment of the present disclosure, the parking voltages of the eighth band to the twelfth band may be calculated through linear interpolation between the parking voltages of the seventh band and the thirteenth band.

In the display device according to the embodiment of the present disclosure, the controller may vary a driving frequency according to a refresh rate, and the gate driver may apply a scan signal having a higher frequency than the driving frequency.

In the display device according to the embodiment of the present disclosure, the scan signal may be twice the driving frequency.

Features, structures, effects, etc. described in the above-described examples of the present disclosure are included in at least one embodiment of the present disclosure, and are not necessarily limited to only one embodiment. Furthermore, features, structures, effects, etc. illustrated in at least one example of the present disclosure may be combined or modified with respect to other examples by those of ordinary skill in the art to which this disclosure belongs. Accordingly, the contents related to such combinations and modification should be interpreted as being included in the scope of the present disclosure.

It will be apparent to those skilled in the art that various modifications and variations can be made in the display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display device, comprising:

a display panel comprising a plurality of pixels connected to a data line and a gate line;

a data driver configured to drive by dividing an active period in which a data voltage is applied to the data line and a blank period in which the data voltage is not applied;

a gate driver configured to apply a scan signal to the gate line; and a controller configured to control the plurality of pixels to be driven in one of a plurality of bands having different highest target luminance, wherein a parking voltage is for being applied to the data line during the blank period, wherein a first parking voltage for being applied to the data line during the blank period is associated with one band and is for being calculated using a black light voltage and a first blue light voltage at one gray level of the one band, wherein a second parking voltage for being applied to the data line during the blank period is associated with another band and is for being calculated using a black light voltage and a second blue light voltage at another gray level of the another band, wherein the another gray level is different from the one gray level, wherein the plurality of bands comprise the one band and the another band, wherein the another band is different from the one band, wherein the plurality of bands provide target luminances at various gray levels, wherein the one band has one highest target luminance at a highest gray level, wherein the another band has another highest target luminance at the highest gray level, wherein the another highest target luminance of the another band is different from the one highest target luminance of the one band, wherein the one band is for being selected for the blank period from the plurality of bands according to an operating environment, and wherein the operating environment is one of a daylight environment, a night environment or a darkroom environment.

2. The display device of claim 1, wherein the plurality of bands comprise first to thirteenth bands, wherein dimming levels of the first to thirteenth bands are adjustable according to a duty ratio of an emission signal or a magnitude of the data voltage.

3. The display device of claim 2, wherein, in the first to seventh bands, the duty ratio of the emission signal is constant and the data voltage is variable.

4. The display device of claim 3, wherein the first to seventh bands have same emission characteristics.

5. The display device of claim 3, wherein, in the seventh band, the parking voltage $V_{park\_a}$ is for being calculated based on a black light voltage Vblack and a blue light voltage $V_{blue}$ in a first gray level G1 through an Equation 1 below.

$$V_{park\_a} = \frac{V_{black} + V_{blue}(G1)}{2} \quad \text{[Equation 1]}$$

6. The display device of claim 2, wherein, in the eighth to thirteenth bands, the duty ratio of the emission signal is variable and the data voltage is constant.

7. The display device of claim 6, wherein, in the thirteenth band, the parking voltage $V_{park\_b}$ is for being calculated based on a black light voltage $V_{black}$ and a blue light voltage $V_{blue}$ in a second gray level G2 through an Equation 2 below.

$$V_{park\_b} = V_{blue}(G2) + 4 * \frac{V_{black} - V_{blue}(G2)}{5} \quad \text{[Equation 2]}$$

8. The display device of claim 1, wherein the parking voltage is for being calculated using a voltage ratio of a black light and a blue light.

9. The display device of claim 8, wherein the plurality of bands comprise first to seventh bands, and wherein parking voltages of the first to seventh bands are the same.

10. The display device of claim 8, wherein the plurality of bands comprise first to thirteenth bands, and wherein a parking voltage of the eighth band to the twelfth band is for being calculated through linear interpolation between a parking voltage of the seventh band and a parking voltage of the thirteenth band.

11. The display device of claim 1, wherein the controller is configured to vary a driving frequency according to a refresh rate, and wherein the gate driver is configured to apply the scan signal having a higher frequency than the driving frequency.

12. The display device of claim 11, wherein the frequency of the scan signal is twice the driving frequency.

13. The display device of claim 1, wherein the parking voltage is an internal division point between a blue light voltage and a black light voltage.

14. The display device of claim 1, wherein:

each of the plurality of bands is configured differently according to a respective highest target luminance; and each of the plurality of bands has a dimming level adjustable differently over a same plurality of gray levels.

15. The display device of claim 14, wherein:

the plurality of bands includes a first band and a second band different from the first band;

the dimming level of each of the first and second bands is adjustable differently according to the respective highest target luminance; and the dimming level of the first band is adjustable over the same plurality of gray levels differently from the dimming level of the second band adjusting over the same plurality of gray levels.

16. The display device of claim 14, wherein:

when the highest target luminance of a first band of the plurality of bands is higher than the highest target luminance of a second band of the plurality of bands, an adjustable range of the dimming level of the first band is greater than an adjustable range of the dimming level of the second band.

17. The display device of claim 14, wherein:

the parking voltage for being applied to the data line in at least one of the plurality of bands has a voltage level different from a voltage level of the parking voltage for being applied to the data line in another one of the plurality of bands.

18. The display device of claim 1, wherein:

for the plurality of bands, a dimming level is variable to adjust a luminance step at a given gray level; and a dimming level is different for each of the plurality of bands over a same plurality of gray levels.

19. The display device of claim 1, wherein each of the plurality of bands is configured for a different operating environment.

20. The display device of claim 19, wherein:

the plurality of bands comprise at least four bands; and at least two of the at least four bands have same emission characteristics.

21. The display device of claim 1, wherein each of the plurality of bands has a same number of luminance steps.

* * * * *